United States Patent
Arkin et al.

(10) Patent No.: US 10,089,395 B2
(45) Date of Patent: Oct. 2, 2018

(54) THIRD PARTY CONTENT INTEGRATION FOR SEARCH ENGINE OPTIMIZATION

(71) Applicant: Broadly, Inc., San Francisco, CA (US)

(72) Inventors: Assaf Arkin, Oakland, CA (US); Joshua Melick, Oakland, CA (US)

(73) Assignee: Broadly, Inc., Oakland, CA (US)

( * ) Notice: Subject to any disclaimer, the term of this patent is extended or adjusted under 35 U.S.C. 154(b) by 629 days.

(21) Appl. No.: 14/698,811

(22) Filed: Apr. 28, 2015

(65) Prior Publication Data

US 2015/0317395 A1    Nov. 5, 2015

Related U.S. Application Data

(60) Provisional application No. 61/986,725, filed on Apr. 30, 2014.

(51) Int. Cl.
*G06F 17/30* (2006.01)

(52) U.S. Cl.
CPC .. *G06F 17/30867* (2013.01); *G06F 17/30864* (2013.01); *G06F 17/30896* (2013.01)

(58) Field of Classification Search
CPC ......... G06F 17/30864; G06F 17/30867; G06F 17/30896
USPC ......................................................... 707/706
See application file for complete search history.

(56) References Cited

U.S. PATENT DOCUMENTS

| 8,180,769 B2 * | 5/2012 | Liu ................... G06F 17/30867 705/14.4 |
| 2005/0102227 A1 * | 5/2005 | Solonchev ............. G06Q 20/10 705/39 |

* cited by examiner

*Primary Examiner* — Shahid A Alam
(74) *Attorney, Agent, or Firm* — Barry N. Young

(57) ABSTRACT

In response to a web client request for access to the original content of an origin website, a content integration server intercepts, modifies the request to designate itself as the requester, and forwards the request to the website. The server receives responsive original content from the website and uses processing instructions to transform the original content by discarding content, modifying the content or supplementing the content by seamlessly integrating third party non-original content, such as consumer reviews and the like, with the responsive original content to respond to the web client request.

18 Claims, 7 Drawing Sheets

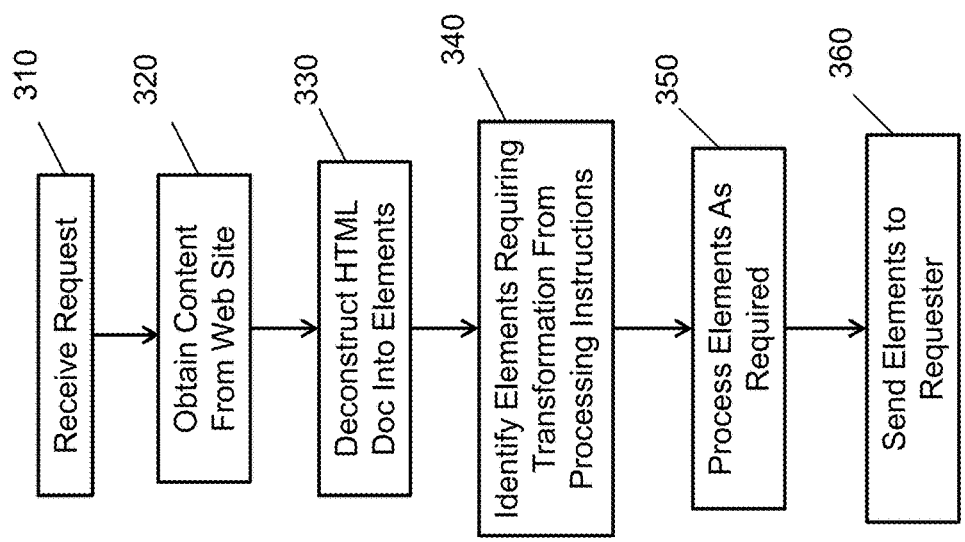

```
1  {
2    "page": ,         "/reviews",
3    "element": ,      "div#reviews",
4    "position": ,     "afterbegin",
5    "content": ,      "http://broadly.com/embed/reviews"
6  }
```

Figure 4A

```
1  <script type="application/broadly+json">
2  {
3    "page": ,         "/reviews",
4    "element": ,      "div#reviews",
5    "position": ,     "afterbegin",
6    "content": ,      "http://broadly.com/embed/reviews"
7  }
8  </script>
```

Figure 4B

```
1  <div id="reviews">
2    <script src="http://broadly.com/embed.js" defer
          data-url="http://broadly.com/embed/reviews">
3    </script>
4  </div>
```

Figure 4C

THIRD PARTY CONTENT INTEGRATION FOR SEARCH ENGINE OPTIMIZATION

CROSS REFERENCE TO RELATED APPLICATIONS

This application claims the benefit of U.S. Application No. 61/986,725, filed Apr. 30, 2014, the disclosure of which is incorporated by reference herein.

BACKGROUND

This invention relates generally to managing website content, and more particularly to the integration of third party content for access by and optimization of search engines.

Many businesses and other entities rely upon their websites to attract and provide information to users. E-commerce businesses, for instance, market and sell to connected consumers primarily by using their websites. When connected consumers make purchase decisions, they are heavily influenced by online sources such as search results, reviews by prior purchasers, comments on social networks, etc. Many such businesses do not have the ability to integrate conveniently or seamlessly consumer reviews, comments, discussion threads, or other third party non-original content into their websites, and particularly in a way that makes the content accessible by user agents such as web browsers, search engine crawlers, bots, and the like. Known approaches that enable incorporation of non-original content into an existing website are problematic. They are generally complex, high cost, or otherwise do not afford the desired seamless integration and access. As such, they are unsuitable for many businesses. Thus, such businesses do not have an easy way of making consumer comments or other third party content accessible by prospective purchasers.

One known approach for incorporating third party content into a website is for the third party content provider to gain read/write access to the original content repository of the origin website, and to use an authoring protocol that allows modification of the original content. Special markers may be manually placed within the content files so that a third party content provider can recognize what portion of a page needs to be altered, and what content to place there. Since these markers need to persist across multiple edits, they are generally made with tags that have no visual rendering, e.g., HTML comments. There are several drawbacks of this approach. First, it requires a standard mechanism for accessing and modifying original content stored in the content repository. Although standardized protocols suitable for this purpose exist, they are not widely used or widely available. Secondly, this approach requires an understanding of how the original content is laid out, e.g., headers, footers, layouts, pages, sidebars, etc., which varies from one service provider to another with no standardization. Thirdly, as with any distributed authoring system, editing conflicts are quite common and are fairly hard to resolve.

Another approach is to use server-side composition, where a web application gathers content from various sources, both local and remote, integrates the content into a single HTML document, and serves the resulting composite document to the user. This approach is characteristic of large on-line retailers having a product catalog comprising an HTML document composed by hundreds of services that collect data and construct the page. Product details may come from one source, reviews from another, shopping card from a third, etc. This approach is complex and expensive to establish and maintain, and is also not suitable for use by many websites.

Another server-side composition approach is to use a web application that includes an API (e.g., a plug-in) and deploy a software component that can use the API to execute operations to compose an HTML document and serve it to a user. However, since each product will have its own API, deployment requirements and market dynamics, this is economical only for a few products that have a large base. The content of a website typically includes script tags which load a sequence of instructions that, when executed by a web browser retrieve contents from a content server and insert it into the document tree of the currently viewed page. JavaScript that executes in a web browser (client-side) is commonly used for a variety of applications for integrating third party content into existing web site, such as display ads, social buttons, rich content embedding, etc. However, automated user web agents (web crawlers, social networks, etc.) typically do not have the same ability to execute JavaScript as does a browser. Thus, while user agents may retrieve the HTML document with the script tags intact, it will be without any of the third party content. Accordingly, search engines cannot index the third party content or the meta-data so it cannot be used to affect search results, and social networks cannot access either the content or meta-data so it cannot be used to control what is shared. Moreover, even when a client-side approach such as a user agent is used to add content, it frequently creates formatting compatibility problems rendering the added content incompatible with the original content.

It is desirable to provide methods and systems that address the foregoing and other problems with known approaches by enabling easy, cost effective and seamless integration of third part content into existing websites such that it is compatible with the original content, accessible to user agents, and optimized for search engines use in indexing and retrieving content. It is to these ends that the invention is directed.

SUMMARY OF THE INVENTION

As will be described, the invention affords a system and method for integrating third party content with original website content, both by inclusion within existing web pages served to requesters and by addition of new web pages. The third party content is integrated with the original content in such a manner that the resulting composition is accessible to both end-user and automated web clients, and such that it is optimized for search engine indexing and social sharing. The system and method readily integrates content from any web hosting provider or any third party content providers into an existing website, without requiring any particular technical or business cooperation with them.

In one aspect, the invention provides a system and method that comprises a network of one or more servers that communicate with web servers and web clients using common web protocols. A content integration server of the network receives a request from web clients, modifies and sends the request to an origin website, executes processing instructions to retrieve third party content (from multiple sources) and transforms and integrates the content seamlessly and compatibly into web pages to provide the resulting composite web pages to a requesting client. The web pages are transformed and integrated so as to be fully accessible by clients and are optimized for search engines.

In another aspect, the processing instructions comprise rules that can be selected from a set of rules to identify one or more documents or one or more HTML elements to transform, the content to be integrated, and its location relative to a transformed element. The rules may be stored and managed separately from the content to enable them to be changed, deleted or supplemented, and are expressed according to common web standards so that they can handle different cases and can be used for different purposes, such as to add, remove, replace or supplement content. The invention also affords a client-side graphical user interface (GUI) tool for providing visibility to users authoring processing instructions. Processing instructions may comprise JavaScript that can be executed either by a browser or by the content integration server.

BRIEF DESCRIPTION OF THE DRAWINGS

FIG. 3 is a diagrammatic overview of a content integration process in accordance with the invention;

FIG. 4A illustrates a processing instruction that may be used for directing the content integration server of the system of FIG. 1;

FIG. 4B illustrates an example of a processing instruction that may appear within the content of a website;

FIG. 4C illustrates an example of client-side JavaScript that may appear within the content of a website and which can be interpreted as a processing instruction;

DESCRIPTION OF PREFERRED EMBODIMENTS

Figure 1:
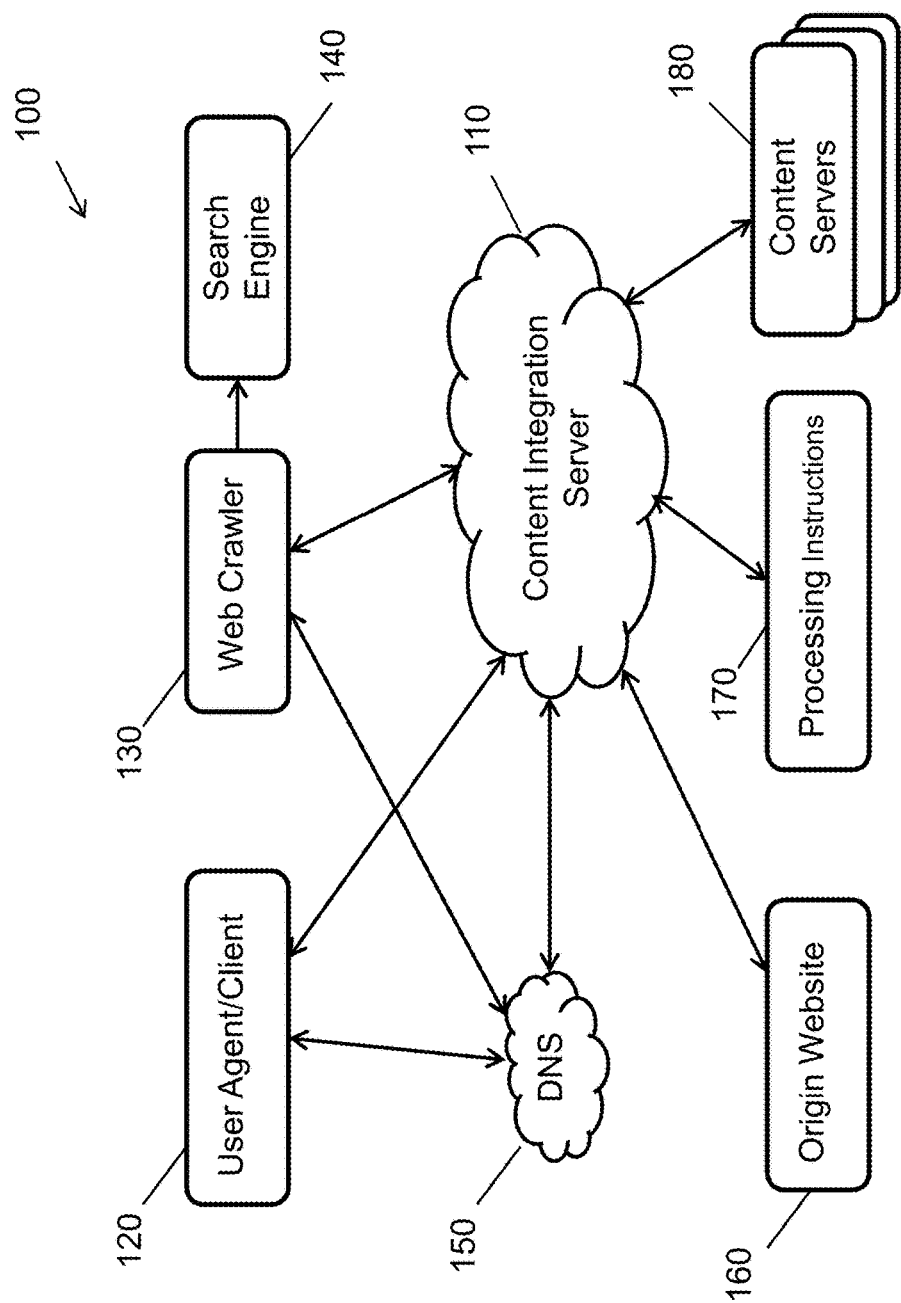
FIG. 1 illustrates a network system for content integration system in accordance with the invention.

FIG. 1 illustrates an embodiment of a network system 100 for seamlessly integrating content into source (origin) web pages in accordance with the invention. As shown, the system comprises a content integration server 110 that may support common web protocols, such as HTTP and WebSockets. The server 110 may communicate with a user agent (UA) web client 120 such as a web browser or the like that visually displays web page content to a user, and with a web crawler (web client) 130 or other types of bots or social networks that index the content on behalf of a search engine 140. The server 110, the user agent 120 and the web crawler 130 may also communicate with a domain name service (DNS) 150 that holds A (IPv4) and AAAA (IPv6) records that associate the hostname of the origin (source) website 160 with its server in the network system. The content integration server 110 may access the DNS and change the records so that requests to the website 160 point instead to the server. In making a request to the website 160, the server 110 or the web clients 120, 130 may use the DNS service 150 to resolve the origin website hostname to its IP address and initiate the request. As may be appreciated, origin website 160 may be only one of multiple websites in the system that may have their content transformed or supplemented with additional content by the content integration server. To avoid conflicts with the A and AAAA records used by the web clients 120, 130, the content integration server may use another DNS server, add a suffix to a hostname, or use alternative technology such as a database server or configuration files to obtain the desired IP address.

The system 100 may additionally include a repository of external processing instructions 170 for controlling the content integration server 110 to access content servers 180 for third party content to supplement the web page original content from the origin web site in satisfying requests. The processing instructions may comprise rules that identify documents or HTML elements to transform, the location where content to be inserted can be obtained, and where to insert the content into the transformed document or element. The processing instruction repository may be controlled by the content integration server to permit the rules to be modified or replaced over time. Processing instructions simplify the processing required by the content integration server 110 by shifting the complexity of content generation to the content servers 180, and expedite the development and delivery of additional features. The processing instructions allow, and may limit, the content integration server access to designated portions of a page on which it operates. External processing instructions are preferably, although not exclusively, used for processing meta-data which appears in a document header. Client-side JavaScript instructions are preferably used for processing content that is rendered visually as part of a webpage. The content integration server may additionally pass request headers from the web clients to the content servers, which request headers the content servers may use to determine what content to send back to the content integration server.

Figure 2:
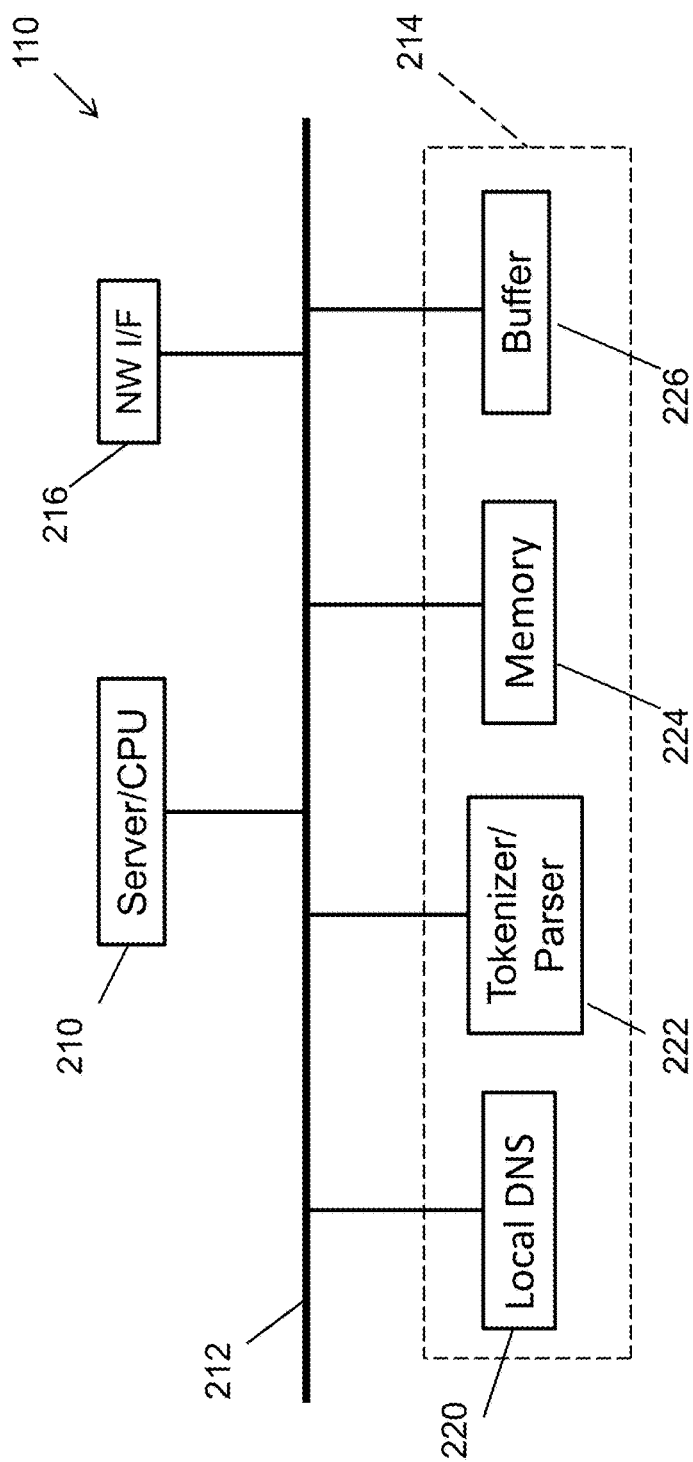
FIG. 2 is a block diagram of an embodiment of a content integration server in accordance with the invention.

FIG. 2 is a block diagram illustrating an embodiment of a content integration server 110 of the system 100 in accordance with the invention. As shown in the figure, the content integration server may comprise a server or central processing unit (CPU) 210 interconnected by a communications bus 212 with storage 214 and a network interface 216 for communicating with clients and other servers of network system 100. Storage 214 may comprise non-transitory computer readable media providing local storage 220 for storing an association between hostnames and IP addresses and for caching DNS records such as local A and AAAA records of websites, a tokenizer/parser application 222 for processing requests, as will be described, a main memory 224 for storing executable instructions for controlling CPU 210 to operate as described herein, and a buffer memory 226 for buffering web pages from website 160 and supplemental third party content from content servers 180. Response latency in the system 100 is very important. This is improved by using the storage 214, e.g., memory 224 and buffer 226, for caching local copies of resources for insertion, and pre-fetching of resources that are used on requests to the website that can be retrieved in advance and stored for immediate use upon receiving a request.

As will become apparent from the description that follows, content integration server 110 serves as a proxy for the server of origin website 160. It receives a request made to the origin website 160 by web clients 120, 130, sends a modified request to the origin website 160 to obtain the requested content, transforms and processes as necessary the original content returned from the origin website in response to the modified request using processing instructions from repository 170, for instance, supplements the original website content by integrating third-party content from content servers 180, and returns supplemented content to the requesting client to satisfy the request. Web clients such as user agent 120 and web crawler 130 that make requests to the origin website 160 are redirected by the DNS 150 to the content integration server 110 which, as indicated above, may modify the request using processing instructions, for instance, to designate itself as the requester, and send the modified request to the website.

FIG. 3 is a diagrammatic overview of an embodiment of a process in accordance with the invention that may be performed by the content integration server. The process of FIG. 3 enables the server to deconstruct an HTML document into its core elements, and observe the structure of a document so that can identify the specific elements that it needs to transform. Advantageously, processing may occur in multiple layers. One layer corresponding to one processing direction may be processed while another layer is buffering events. At no point is the buffer required to hold the entire HTML document in memory, but rather only a minimal representation of the current location in the document structure. The streaming architecture of the server allows it to send events to the requesting web clients as soon as processing is completed on them, so that the web client requester can begin integrating content into a webpage. The server may also stream events directly to the web client until the need arises to buffer the events (which delay can also be diminished by caching and pre-fetching, as described below). This results in minimal processing latency. In addition to the HTML document, visual rendering of web sites requires resources, such as CSS style sheets, JavaScript and fonts. The needed resources may be listed in the HTML document header so the browser can begin to retrieve them as soon as it has the beginning of the document. This has a significant effect on the perceived load time of a page.

Referring to FIG. 3, at 310 the content integration server receives a request made to website 160 from a web client 120, 130. The server may modify some properties of the request as, for example, to communicate with website 160 using a different protocol, modify request headers to support content caching and compression, or identify the content integration server as the originator of the request before forwarding the request to the website. At 320, the server receives a response from the website to its request and obtains the requested content in the form of an HTML document. The content may arrive from the origin website in chunks, possibly as individual TCP packets or as collections of packets depending upon the transport speed and buffering. At 330, the server may deconstruct the HTML document into its elements. Upon arrival, each chunk may be processed through the streaming HTML tokenizer and parser 222 of the content integration server 110 to generate a stream of events corresponding to relevant HTML parts, i.e., open tags, close tags, text content, comment or processing instructions. The server may use a Simple API for XML (SAX) parser that parses an HTML document into a stream of discrete events, and processes each event individually. In particular it may use the open tag events which contain the element name and its attributes to decide when to apply a particular processing instruction. The parser may detect void elements and elements that are not closed within their parent, such that all open tags will have a corresponding closed tag. The server may maintain a stack of elements in storage that it can use to match each event against a list of selectors.

At 340, the process may identify elements that require transformation or further processing by using external processing instructions from repository 170 or processing instructions internal to a response document from the website. Processing instructions instruct the server to perform some transformation on a document. Each processing instruction may have a selector that identifies one or more elements that need to be transformed. Selectors may use an addressing mechanism such as described in the Cascading Style Sheet (CSS) Level 2, Rev. 1 recommendation of the W3C.

External processing instructions are particularly useful for generic manipulations that may affect all pages of a website without having to modify any of the pages. They may add, for example, meta-data to a page header or analytics tracking code to a document body. JavaScript embedded within a document may also act as a processing instruction. Advantageously, when the web page is viewed in a web browser, the third party content being inserted is visible for editing the web page, thereby facilitating authoring. At 340, the process may identify an HTML script element acting as processing instruction, extract the properties of the processing instruction from the HTML attributes of the script element, execute the processing instruction, and discard the script element. In that way, the same content may be inserted into the document either by the web client web browser acting on the script element performing the JavaScript instructions conveyed there, or on the server side by the server 110 acting on the script element as processing instruction, in either case making it is accessible to all web client user agents.

The content integration server may determine whether a processing instruction is applicable to the current page either from having instructions located within the page content, or by matching the document path of the request against a pattern specified within the processing instruction. It may match an event based upon the element name and attribute values. For example, a selector "div.reviews" matches an event related to an element of type "div" with an attribute named "class" having the value "reviews". FIG. 4A illustrates an expression using such a pattern language.

A processing instruction may include a guard or a precondition that determines whether to execute that processing instruction or another processing instruction. A guard indicates to a processing instruction whether it should apply to the current document by determining if the document meets certain preconditions. Guards may be positive or negative. A positive guard may use a CSS selector to determine whether one or more elements exist in the document prior to executing the processing instruction. A negative guard uses CSS selectors to ensure that one or more elements do not exist in the document before allowing the processing instruction to execute. For example, there may be a processing instruction that inserts content having Open Graph tags (used, for instance, by a social network for sharing links) in the document header. If one wants to apply this processing instruction to every website page, but only if the page does not already have these tags so as to avoid duplication, a negative guard expression can accomplish this. A negative guard may select all elements such as "[og:title].[og.description]" which have an attribute named "og:title" or "og:description", and prevent the processing instruction from operating on documents containing those elements.

Figure 6:
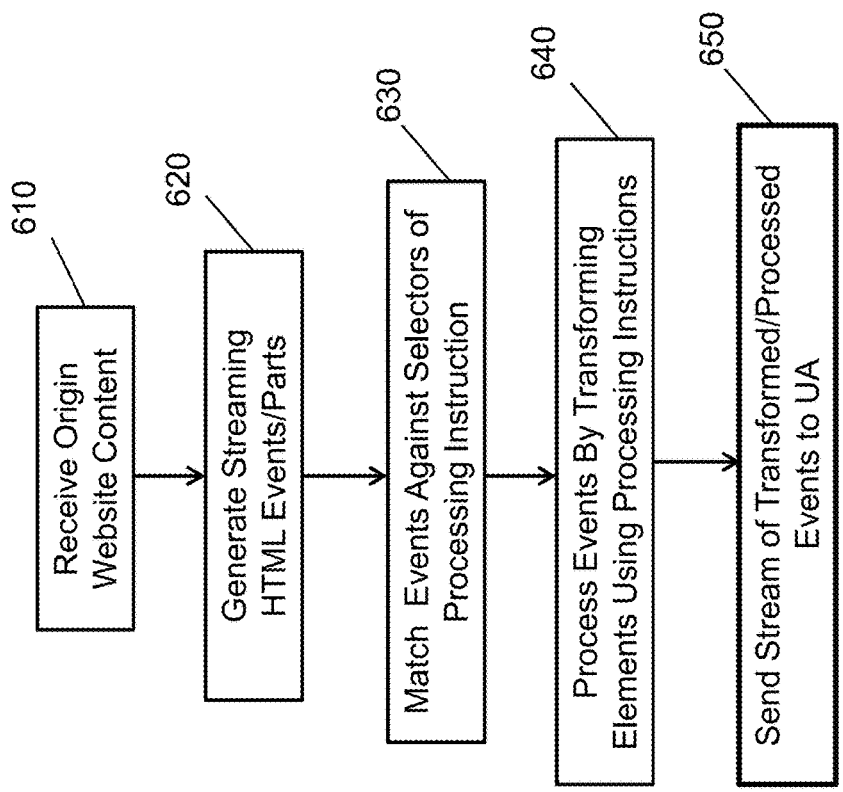
FIG. 6 is a diagrammatic view illustrating a portion of the process of FIG. 3 in more detail.

A selector may also match an event based upon descendent and adjacent elements. A transformation may discard a selected element, or insert content into it, or replace the selected element entirely with content from a content server 180. If an insertion is before an opening/closing tag, the event may be buffered in buffer 226 (FIG. 2) while content is retrieved. The content may be added to the stream with the buffered events. If the insertion is after the opening/closing tag, the event may be streamed and subsequent events may be buffered until the contents are retrieved and added to the stream. This process is illustrated in FIG. 6 and will be further described below.

At 350, the elements are processed as required. They may then be discarded or sent to the requesting web client at 360. Events that do not require further processing may simply be transformed back into equivalent HTML representations before being sent back. Events that are further processed may be discarded, replaced, or the content may be buffered and supplemented by another stream of content. As such, the web client is able to render portions of the response without having to wait for the server 110 to complete receiving and processing content from the website 160 and content servers 180.

Upon receiving the request at 310, the server may obtain processing instructions from the processing instruction repository 170. The processing instructions may comprise a set of common instructions that apply generally to any website, and a set of specific processing instructions determined by the website hostname that apply to the specific website to which the request is provided. FIG. 4A illustrates an example of a processing instruction that operates on documents with the URL "/reviews", applied to an HTML "div" element with the identifier "reviews". It retrieves contents from a specific URL, and inserts that content after the opening tag of the selected element.

The server may additionally extract processing instructions from the contents of the response document. FIG. 4B illustrates a processing instruction enclosed within a script element that allows it to be included with an HTML document. In this particular example, the script element is identified as a processing instruction because it has the "type" attribute with the value "application/broadly+json". As may be appreciated, other HTML attributes and values may be used as well in processing instructions.

The server 110 may also extract processing instructions from the contents of a document supplied in response to a request by identifying elements that follow a particular pattern, and extracting relevant properties from their attribute values and child elements. FIG. 4C illustrates such a processing instruction in the form of an HTML script element. When executed by a web browser, this script will retrieve content from the URL specified by the "data-url" attribute and insert it into the document tree. The server 110 identifies the script element as a processing instruction based on the known value of its "src" attribute. It defaults to selecting the script element itself as the element to replace, and uses the value of the "data-url" attribute as the content to replace it with. Other HTML attributes and values may be used as well.

Figure 5:
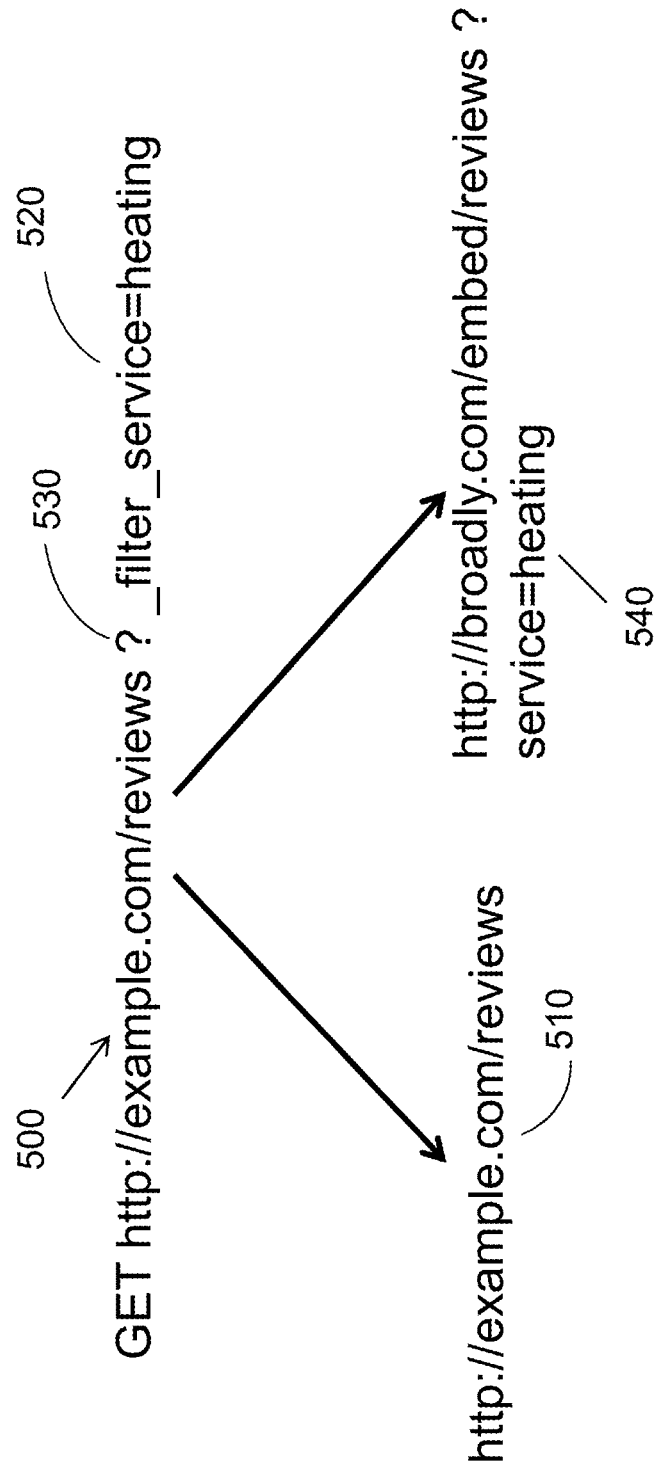
FIG. 5 illustrates an example of an HTTP request header identifying the location of a "template" page and having a query string for retrieving third party content.

The server may select a subset of processing instructions based on the type of the response document. It may refer to the content type declared in headers that are part of the response message, or attempt to determine the document type by inspecting the first few bytes of the document entity. FIG. 5 illustrates an example of an HTTP request header with a composite document path 500. A first portion 510 of the header is used when forwarding the request to the website, and a second portion 520 is used to retrieve content from a content server. The first and second portions may be separated by a marker 530, in this case using the prefix "_filter_" to identify query parameters addressing the content server. The embodiment described here illustrates the handling of document types such as HTML and XHTML, but as may be appreciated, it may also handle other types.

As indicated above, FIG. 6 illustrates an overview of a portion of the process of FIG. 3. Referring to FIG. 6, at 610 the server 110 receives content from the origin website 160, e.g., in chunks. At 620, the process generates streaming HTML events (HTML parts) using the tokenizer/parser, as previously described. At 630, events are matched against selectors of processing instructions, and at 640 the events are processed as soon as they are available from the tokenizer/parser. Processing of events is controlled by the processing instructions. The server may maintain a stack of elements that can be used to match each event against a list of selectors. Processing transforms events by modifying, supplementing, discarding or replacing events, as described above. At 650, the stream of processed/transformed events is sent to the requesting web client.

The invention may further afford "content expansion" by which a single web page on the origin website server serves as a template for rendering multiple response pages of additional content to the requesting user agent. The additional web pages may be introduced dynamically into the website using the existing website as a template for creating the pages. When the content integration server has a large data set on which to operate, e.g., hundreds of user reviews, it may break up the data set into faceted subsets. One faceted subset may contain, e.g., all reviews left within previous predetermined period of time; another faceted subset may comprise all "five star" reviews; and still others may comprise reviews in other categories. Faceted subsets may be created dynamically by extracting an attribute, e.g., geographic location, or a key word from pieces of content. The content server may select subsets and introduce links, e.g., URLs, to pages that would show the selected subsets of content. This may be accomplished by including additional query parameters in a current page URL using a predetermined convention such as a known prefix. Upon processing a request, the content integration server 110 looks at the request URL to identify any such query parameters, removes them before sending the request to the origin website 160 server, and adds the query parameters to a URL of a content server 180 to retrieve a resource.

FIG. 5 illustrates an example of this. The origin website server may contain a single page with the path "/reviews", which by means of processing instruction includes contents from a resource "/embed/reviews" 540. Since there may be many reviews, that resource may include a link to content "/reviews?_filter_service=heating" that may not exist on the origin website server. However, when requesting the content from the integration server, the server will retrieve the page "/reviews" from the origin website, and the content integration server will retrieve the resource "/embed/reviews?service=heating" to insert the review content into the response to the user agent web client. Similarly, the web crawler 130 (FIG. 1) will find one page for "reviews" that links to another page showing reviews that are tagged "heating", and will index that additional content for the search engine 140.

Figure 7:
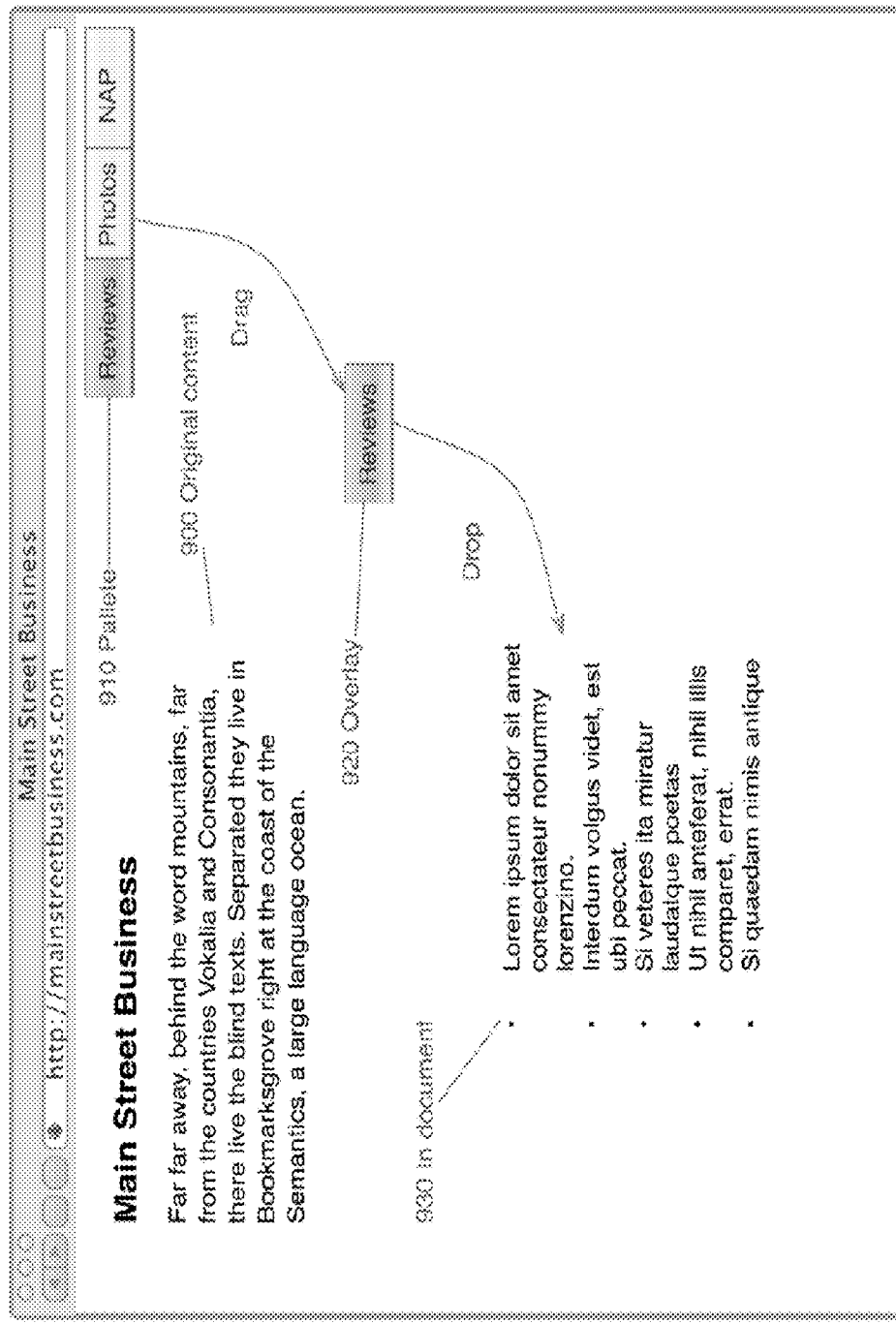
FIG. 7 illustrates an example of a graphical user interface (GUI) in accordance with the invention layered on top of a web page for creating and editing processing instructions.

The invention may additionally provide a graphical user interface (GUI) layered on top of a web page, as shown in FIG. 7, that presents a palette 910 of third party content. A user may manipulate an element 920 from the palette, as by dragging and dropping it on any location on the page 930. This will insert the element into the document tree so that it may be viewed by an end user in the selected location by finding the closest element based upon viewpoint coordinates.

Thus, as seen from the foregoing, the invention seamlessly and dynamically integrates additional external third party content into existing website content so that it is available to user agents and optimized for indexing and locating by search engines. Since the external content is not part of the original origin website content, it may be easily modified and updated as needed, and included in the origin website content without the necessity of redesigning original web pages and without concern that its integration will disrupt the origin website formatting.

While the foregoing has been with reference to particular embodiments of the invention, it will be appreciated that changes to these embodiments may be made without departing from the principles of the invention, the scope of which is defined in the appended claims.

The invention claimed is:

1. A method of integrating non-original content into original content of an origin website in a network, comprising:
   receiving by a content integration server a request from a network client for access to said original content of said origin website;
   forwarding a modified request from the content integration server to a web server of said origin website, said modified request designating said content integration server as the requesting network client for receiving the requested original content;
   deconstructing streaming HTML original content received from the origin website by the content integration server into a stream of discrete events corresponding to HTML tokens;
   identifying, by said content integration server using a processing instruction applicable to one or more HTML elements based upon an opening tag, one or more of the HTML elements that require transformation to include non-original content;
   transforming said one or more HTML elements by integrating said non-original content into the HTML elements; and
   responding to the requesting network client by streaming discrete HTML tokens of the requested original content integrated with said non-original content as such discrete HTML tokens are formed to minimize latency.

2. The method of claim 1 further comprising retrieving a resource identified by said processing instruction that contains said non-original content, extracting the non-original content from said resource, and integrating said non-original content with said original content in responding to said requesting network client.

3. The method of claim 1, wherein said identifying comprises identifying an HTML element by matching the element to a selector in said processing instruction.

4. The method of claim 1, wherein said deconstructing comprises deconstructing said original HTML content into core elements to identify the structure of the content and the specific elements to transform, and to identify the non-original content to be integrated.

5. The method of claim 1, wherein said processing instruction is indicated in a document retrieved from said origin website.

6. The method of claim 1, wherein said processing instruction is one of a plurality of processing instructions in a repository.

7. The method of claim 1, wherein said processing instruction comprises JavaScript included in original content provided by said origin website in response to said modified request, said JavaScript being interpreted by said content integration server as an instruction to replace said original content with said non-original content to provide said integrated content.

8. The method of claim 1, where said transforming comprises one of modifying, discarding or replacing web pages of said origin website.

9. The method of claim 1, wherein said streaming comprises integrating said non-original content seamlessly with said original content in said said discrete tokens while maintaining original content formatting for said integrated content.

10. A non-transitory computer readable medium embodying executable instructions for controlling a content integration server computer of a network to perform a method of integrating non-original content into original content of an origin website in the network, comprising:
    receiving by the content integration server a request from a network client for access to said original content of said origin website;
    forwarding a modified request from the content integration server to a web server of said origin website, said modified request designating said content integration server as the requesting network client for receiving the requested original content;
    identifying, by said content integration server using a processing instruction applicable to one or more HTML elements based upon an opening tag, HTML elements, that require transformation to include non-original content;
    transforming said one or more HTML elements by integrating said non-original content into the HTML elements; and
    responding to the requesting network client by providing streaming discrete tokens of the requested original content integrated with said non-original content as such discrete tokens are formed to minimize latency.

11. The non-transitory computer readable medium of claim 10 further comprising instructions for retrieving a resource identified by said processing instruction that contains said non-original content, extracting the non-original content from said resource, and integrating said non-original content with said original content in responding to said requesting network client.

12. The non-transitory computer readable medium of claim 10, wherein said identifying elements comprises identifying an HTML element by matching the element to a selector in said processing instruction.

13. The non-transitory computer readable medium of claim 10, wherein said deconstructing comprises deconstructing said original HTML content into core elements to identify the structure of the content and the specific elements to transform, and to identify the non-original content to be integrated.

14. The non-transitory computer readable medium of claim 10, wherein said processing instruction is indicated in a document retrieved from said origin website.

15. The non-transitory computer readable medium of claim 10, wherein said processing instruction is one of a plurality of processing instructions in a repository.

16. The non-transitory computer readable medium of claim 10, wherein said processing instruction comprises JavaScript included in a original content provided by said origin website in response to said modified request, said JavaScript being interpreted by said content integration server as an instruction to replace said original content with said non-original content to provide said integrated content.

17. The non-transitory computer readable medium of claim 10, wherein said streaming comprises integrating said non-original content seamlessly with said original content in said said discrete tokens while maintaining original content formatting for said integrated content.

18. A system for integrating non-original content into original content of an origin website in a network, comprising:

a content integration server configured to receive a request from a network client for access to said original content and to send a modified request to the origin website designating the content integration server as the requesting network client;

a tokenizer and parser controlled by said content integration server to generate streaming HTML original content in a response to said modified request from a web server of said origin website;

said content integration server further being configured to:

identify, using a processing instruction applicable to one or more HTML elements based upon an opening tag, HTML elements that require transformation to include non-original content;

transform and integrate said non-original content into said HTML elements with said original content; and respond to the requesting network client by streaming discrete tokens of the original requested content integrated with the non-original content as such discrete tokens are formed to minimize latency.

* * * * *